Dec. 22, 1936.  A. NITTKA  2,065,090
FLUID PRESSURE PUMP OR MOTOR
Filed Dec. 3, 1934
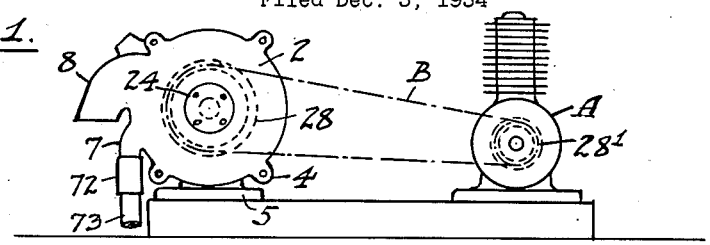
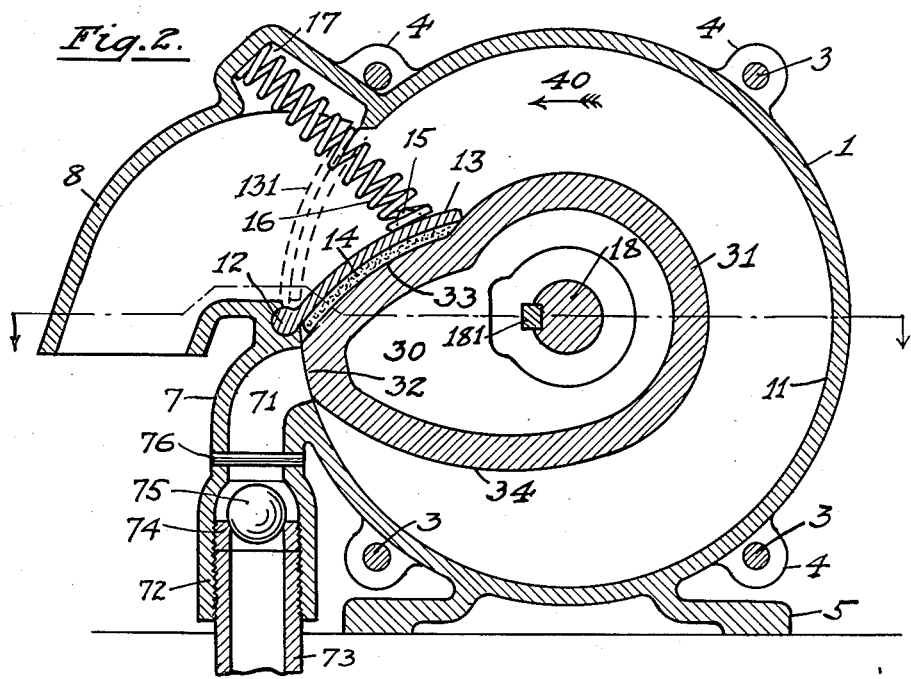
INVENTOR:—
Alfredo Nittka Patented Dec. 22, 1936

2,065,090

UNITED STATES PATENT OFFICE 2,065,090

FLUID PRESSURE PUMP OR MOTOR

Alfred Nittka, Pigeon, Mich.

Application December 3, 1934, Serial No. 755,774

1 Claim. (Cl. 103—124)

My invention relates to fluid pressure pumps or motors and its principal object is to provide a pump of the rotary type which is simple in construction and especially economical to manufacture in the smaller sizes, so that it may be sold very cheaply for use on the farm and in other isolated places where the cost of installations of the present type would be prohibitive.

It is contemplated also that my invention may be equally adapted for use as a motor to be driven by compressed air, water, or other fluid pressure, but in order that my said invention may be understood by those skilled in the art, I will now describe the same as applied to a pump, reference being had to the accompanying drawing in which—

Figure 1 is a side elevation showing my improved pump connected to and operated by a small gasoline engine A of the air-cooled type, through belt B and pulleys 28, 28'.

Figure 2 is a vertical section of the pump taken in a plane at right angles to the axis, and drawn to an enlarged scale.

Figure 3 is a horizontal section on line 3—3 of Figure 2.

Like characters designate corresponding parts through the several views.

1 is the housing preferably formed of a single casting and having a cover 2 secured to it by bolts 3 which pass through lugs 4 integral with the housing and through corresponding lugs upon the cover. In one piece with the housing is a base plate 5 having bolt holes 6 by which it may be secured to any desired form of base or support.

Integral with the housing is an inlet connection 7 and also an outlet spout 8. The inlet connection comprises a port 71 which communicates with the inside of the housing and terminates at its upper end upon the internal bore 11 of the housing while its lower end is provided with an internally screw threaded socket 72 adapted to receive a suction pipe 73. Within the socket 72 is also an annular seat 74 adapted to receive a spherical check valve member 75, the upward movement of which is limited by the transverse pin 76 as shown in Figure 2. Hinged at 12 to the interior of the housing is a valve of the flap type 13 provided with an inner facing 14 of rubber, leather, or other suitable material, the inner surface of which is of arcuate form having the same radius as the bore 11 of the housing and adapted to form a continuation thereof when the valve 13 is in its extreme outward position as indicated in broken lines at 131. Upon the outer surface of the valve 13 is a projection 15 with which engages one end of a helical compression spring 16, the other end of which is seated in a pocket 17 formed integral with the spout 8.

Centrally disposed within the housing is a shaft 18 mounted in ball bearings 19, 20. The outer races of these bearings are secured within bosses 21, 22 respectively upon the housing by means of the covers 23, 24, while the inner races are secured upon reduced portions of the shaft by nuts 25, 26 in the well known manner. The cover 24 forms a complete closure for the opening in the hub 22 while the cover 23 has a circular opening through which passes the shaft extension 27 upon which is secured the pulley 28 or other desired form of driving element, leakage between the cover and the shaft being prevented by felt or other packing 29. Mounted upon the shaft 18 and secured thereto by the key 181 is a rotor 30 preferably formed from hard rubber, bakelite or other of the well known plastic materials. The rotor is provided with flat surfaces adapted to fit against the inner faces of the housing and the cover while its periphery is of cam-like shape having a small concentric portion 31 spaced apart from the inner periphery of the bore 11 and also a larger concentric portion 32 adapted for sliding contact with the said inner periphery, and intermediate these large and small external surfaces are spiral or other cam-like portions 33, 34, the portion 34 being of gradually increasing radius as shown, while the portion 33 is of a constant radius similar to that of the bore 11, so that when the rotor is in the the position shown in Figure 2 the said portion will make a perfect contact with the facing 14 of the flap valve 13.

The operation of the pump is as follows—Commencing with the parts in the relative positions shown in Figure 2, and the rotor 30 being caused to revolve, together with its shaft, in the direction indicated by the arrow 40, driving before it the fluid already contained in the space between the rotor and the housing which is discharged through the spout 8, the spiral cam portion 34 acts upon the flap valve 13 and gradually moves it outwards until it occupies the position indicated in broken lines at 131, the large-radius peripheral surface 32 of the rotor then moving across the inner surface of the facing 14 upon the valve. The portion 32 then leaves the flap valve behind and allows it to move inwards under the action of the spring 16 so that it again occupies the position shown in full lines in Figure 2. In the meantime, a further supply of fluid has been drawn into the casing through the port 71, as will be understood, and the cycle of operations is repeated. In this manner a practically continuous flow of fluid is obtained, varying in quantity according to the dimensions of the pump and the speed of the rotor which will be ranged to suit the purpose for which the pump is to be used.

While I have herein described and illustrated a preferred embodiment of my invention, it will be readily understood that details of the same may be varied to suit any particular requirement without departing from the spirit of my invention as defined in the appended claim. Furthermore, as hereinbefore mentioned, my device may be adapted for use as a motor, but I have not shown or described this form of the device since the principles involved in such adaptation are well known.

What I claim and desire to secure by Letters Patent of the United States is:

In a pump body, the combination, with a housing having a cylindrical bore and having one end integral therewith, of a rectangular discharge spout three sides of which are integral with said housing, and a cover upon the other end of said housing having an extension adapted to form the fourth side of said spout, and a cylindrical inlet connection integral with said housing and positioned below said spout.

ALFRED NITTKA.